Patented Dec. 7, 1937

2,101,241

UNITED STATES PATENT OFFICE 2,101,241

LUBRICATING OILS

Joseph Cole, Whiting, Ind., assignor to Sinclair Refining Company, New York, N. Y., a corporation of Maine No Drawing. Application September 30, 1936, Serial No. 103,365

4 Claims. (Cl. 87—9)

My invention relates to improvements in anti-oxidants, compounding agents to be added to petroleum lubricating oils to inhibit or to retard degradation of the oil by oxidation, and in methods of making such anti-oxidants.

I produce the anti-oxidant of this invention by reacting chlorinated paraffin wax and oleic acid with anhydrous aluminum chloride, neutralizing or partially neutralizing the mixture produced by this reaction with lime, and recovering the anti-oxidant product by distillation from the resulting mixture.

Specifically, the anti-oxidant of this invention is conveniently produced as follows: A mixture of 250 parts (by weight) of chlorinated paraffin wax containing about 43% (by weight) of chlorine, 250 parts of oleic acid and 15 parts of anhydrous aluminum chloride is gradually heated to 550° F. while maintaining thorough stirring. Hydrogen chloride is evolved during this heating. 25 parts of lime is then added to this hot mixture and the whole is transferred to a still from which about 80% of the mixture charged is taken off as a distillate product under a high vacuum, 10 millimeters of mercury absolute pressure for example. In one instance the gravity of the distillate product thus obtained was 34° A. P. I. This distillate product is the anti-oxidant of my invention.

The following comparison will indicate the anti-oxidant value of this compounding agent: 2 glass beakers containing equal amounts of the same South Texas pale oil having a viscosity of 500 seconds at 100° F. Saybolt Universal and boiling 10% up to 100° F. and 90% up to 900° F., approximately, were slowly heated to 550° F. and maintained at this temperature for 4 hours while exposed to the air. The oil in one of these beakers included 1% (on the oil) of the anti-oxidant produced as just described, the other none. At the end of this period, the beaker containing the oil without the anti-oxidant was marked by a ring of carbonized sludge at the oil level whereas the beaker containing the oil including the anti-oxidant was free of any such ring. Naphtha washing of the beaker which had contained the oil including the anti-oxidant left it clean, whereas the ring of carbonized sludge remained in the other beaker through naphtha washing.

My invention includes this anti-oxidant and petroleum lubricating oils compounded with this anti-oxidant as well as the method of making the anti-oxidant. However, I do not now have any better mode of identifying the anti-oxidant than by the method by which it is made.

I claim:

1. A method of making an anti-oxidant comprising reacting chlorinated paraffin wax and oleic acid with anhydrous aluminum chloride, reacting the product of this reaction with lime, and recovering an anti-oxidant product by distillation from the resulting mixture.

2. An anti-oxidant which comprises the product produced as in claim 1.

3. Compounded petroleum lubricating oils comprising the anti-oxidant produced as in claim 1.

4. The method of inhibiting the oxidation of petroleum lubricating oils which comprises reacting chlorinated paraffin wax and oleic acid with anhydrous aluminum chloride, reacting the product of this reaction with lime, recovering an anti-oxidant product by distillation from the resulting mixture, and adding the anti-oxidant product to the petroleum lubricating oil.

JOSEPH COLE.